Dec. 18, 1956 J. E. JENDRISAK 2,774,189
APPARATUS FOR BENDING GLASS SHEETS OR PLATES
Filed March 12, 1952 3 Sheets-Sheet 1

Inventor
Joseph E. Jendrisak
By Nobbe & Swope
Attorneys

Dec. 18, 1956 J. E. JENDRISAK 2,774,189
APPARATUS FOR BENDING GLASS SHEETS OR PLATES
Filed March 12, 1952 3 Sheets-Sheet 2
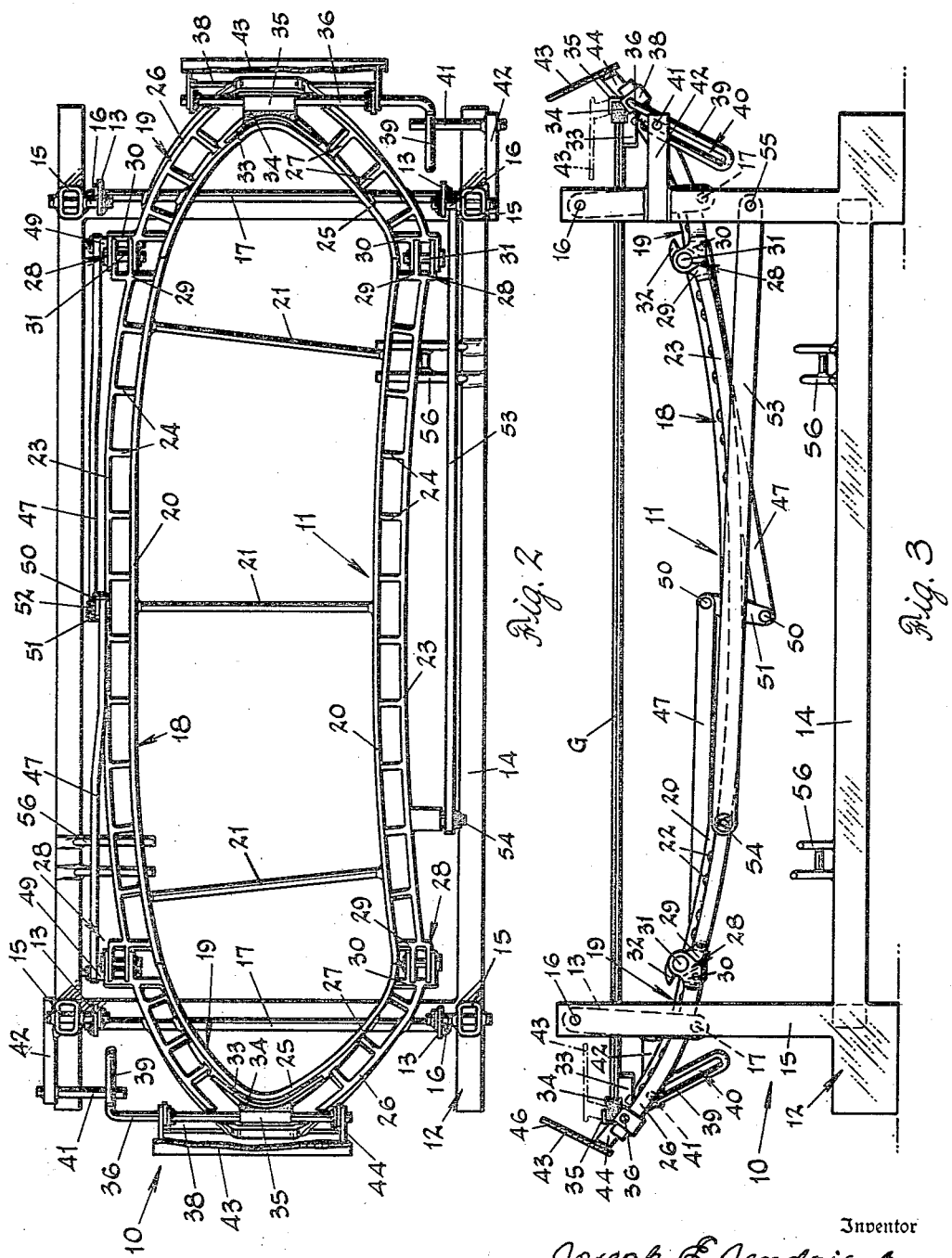
Inventor
Joseph E. Jendrisak
By Nobbe & Swope
Attorneys Dec. 18, 1956 J. E. JENDRISAK 2,774,189
APPARATUS FOR BENDING GLASS SHEETS OR PLATES
Filed March 12, 1952 3 Sheets-Sheet 3

Inventor
Joseph E. Jendrisak
By Nobbe & Swope
Attorneys

United States Patent Office 2,774,189
Patented Dec. 18, 1956

2,774,189

APPARATUS FOR BENDING GLASS SHEETS OR PLATES

Joseph E. Jendrisak, Rossford, Ohio, assignor to Libbey-Owens-Ford Glass Company, Toledo, Ohio, a corporation of Ohio Application March 12, 1952, Serial No. 276,090

11 Claims. (Cl. 49—67)

The present invention relates to the bending of sheets or plates of glass or the like, and more particularly to improved apparatus for this purpose including a multi-section, hinged type mold and means for controlling and synchronizing the movements of the associated parts of the mold.

The apparatus contemplated by this invention is designed to solve the particular problems presented in bending glass sheets, either singly or in matched pairs, to shapes having severe or sharp bends such, for example, as substantially broad U shapes.

Because of the severity of the bends and the relatively large ratio of flat length to bent length involved in the molds required for bending to such shapes, the flat sheets upon being softened by heating do not naturally, and of their own weight, settle into accurate conformity with the shaping surfaces of such molds. Consequently, the prior art structures and procedures which rely solely on temperature and gravity to cause the glass sheet to bend to the exact mold contour are not suitable for this purpose.

However, in my copending application Serial No. 231,575, filed June 14, 1951, I have disclosed one form of bending apparatus, including a multi-section hinged mold, by means of which such shapes can be produced.

The present invention, which constitutes an improvement thereon and is a continuation-in-part thereof, is based on my discovery that greatly improved results can be obtained in producing bends of the character described with multi-section hinged molds by (1) controlling the movements of the associated parts of said mold, (2) synchronizing the movement of selected parts of said mold and/or (3) causing other selected parts of the mold, for supporting the glass sheet in bending relation to the mold and lowering it onto the mold during bending, to move in timed relation to the movement of the mold.

It is therefore an object of this invention to provide an improved apparatus by which flat sheets of glass may be readily and more precisely bent to severe curvatures.

Another object of this invention is to provide an improved apparatus for bending flat sheets of glass to severe curvatures wherein said sheets will be guided from their flat position to their severely bent position onto a mold shaping surface in timed relation to movement of the mold.

Still another object of this invention is to provide an improved apparatus for bending flat sheets of glass to severe curvatures wherein the movements of hingedly connected mold sections of said apparatus are synchronized and stabilized.

Other objects and advantages of the invention will become more apparent during the course of the following description when taken in connection with the accompanying drawings.

To accomplish these objects, this invention contemplates a bending mold comprising hingedly connected sections and a frame support therefor which will control the influence of the weight of the mold on the glass sheets throughout the movement of the mold from the open to the closed position by progressively increasing such influence as the glass sheets settle into the mold. That is, similarly to the apparatus of my aforementioned copending application, apparatus of this invention makes possible a minimum of weight influence on the sheets in the initial stage of the bending when the sheets have not been sufficiently softened and are still in a brittle condition, and a progressively increasing influence as the sheets become soft to a maximum at the final stage of the bending when the severe curvatures are being formed. In addition, however, this invention contemplates a novel apparatus by which the sheets will be initially located and supported in a flat position and then guided during their descent onto the mold shaping surface in timed relation to the movement of the mold into the aforementioned closed position. Further, this invention contemplates a novel apparatus by which the movement of selected sections of the mold are synchronized and stabilized.

In the drawings, wherein like numerals are employed to designate like parts throughout the same:

Fig. 2 is a top plan view of the apparatus with the mold in the open position;

Fig. 3 is a side elevation of the apparatus as shown in Fig. 2;

Figure 1:
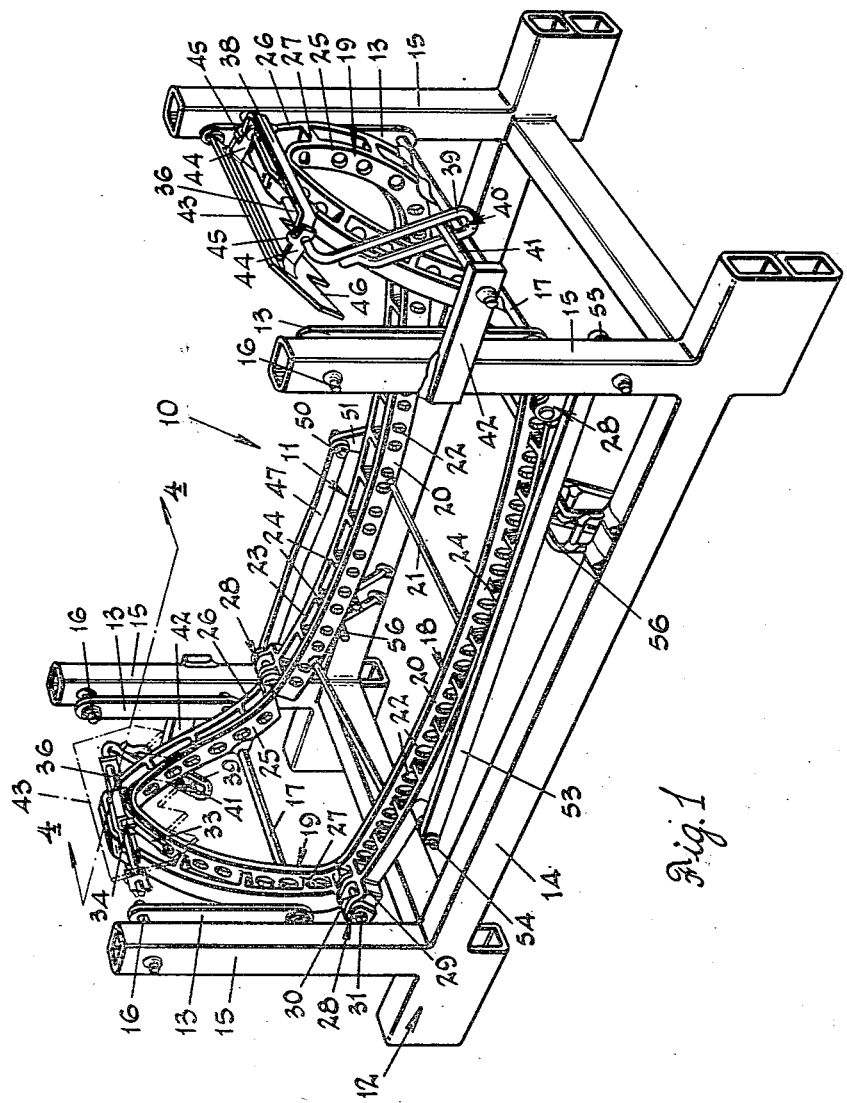
Fig. 1 is a perspective view of a bending apparatus constructed in accordance with this invention and in which the mold is in the closed position.

Referring now in particular to the drawings, there is illustrated in Fig. 1 an improved bending apparatus constructed in accordance with this invention and designated in its entirety by the numeral 10. This apparatus comprises a skeleton or ring-type, multi-section mold 11 swingably carried on a rigid frame 12 by means of vertically disposed, freely-swinging links 13.

The frame 12 includes a generally rectangular base member 14 and vertically disposed posts 15 upstanding from the corners of said base member and perpendicular thereto. Freely-swinging links 13, which are arranged in pairs at opposite ends of the frame, have their upper ends pivotally supported adjacent the upper ends of posts 15 by means of stub shafts 16, which project inwardly and horizontally from said posts. The freely-swinging lower ends of each pair of links are joined by a cross-rod 17 journaled in openings in said ends, and the mold 11 is secured to and supported by said cross-rods.

Mold 11, which is of the so-called ring type, comprises a center section 18 that is made up of the spaced, substantially parallel side members of the mold, and end sections 19 that are substantially U shaped in plan and connect adjacent ends of the spaced side members. The center section 18 includes spaced, substantially parallel inner rails 20, connected together by transversely disposed reinforcing rods 21, and having openings 22 longitudinally thereof to facilitate transmission of heat to the edges of the glass sheet. The upper surfaces of these rails form the shaping surface of this section of the mold, to which the glass sheet to be bent is adapted to conform. Spaced from the inner rails 20 are outer rails 23, substantially parallel to said inner rails and connected thereto by cross members 24. Similarly, each end section 19 includes an inner rail 25, which defines the shaping surface of said end section, and an outer rail 26 substantially parallel to said inner rail and spaced therefrom by cross members 27.

Figure 4:
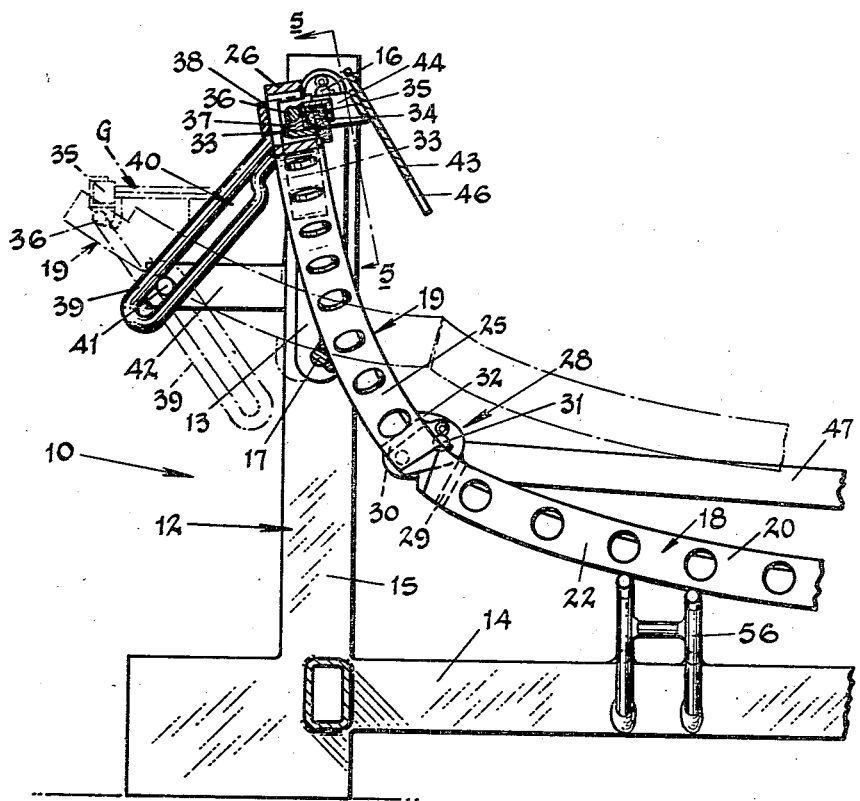
Fig. 4 is a fragmentary sectional view taken substantially on line 4—4 of Fig. 1.

End sections 19 are pivotally connected to the opposite ends of center section 18 by means of hinge joints, designated generally as 28. Each of these joints comprises interfitting F shaped members 29 and 30 (Fig. 2) integral with or fixedly secured to the adjoining ends of the inner and outer rails of center section 18 and end sections 19, respectively. Preferably, as shown, members 30 are spaced apart to receive members 29, and said members are retained in proper interfitting relationship by means of pins 31 journaled in openings in the longitudinal legs of said members. The end faces of the inner and outer rails of both the center and end sections are finished in such a manner that when the mold 11 is in the open position (Figs. 2 and 3), said end faces abut against one another preventing further opening movement of the mold. Also, each member 29 has a projecting lug 32 which, as best shown in Fig. 4, engages the transverse leg of member 30 when the mold is in the closed position thereby preventing overbending of the mold sections.

The shaping or upper faces of the inner rails 20 and 25 of the center and end sections, respectively, are finished in such a manner as to provide, when the mold is in the closed position, a smooth joint which conforms, preferably at the point of greatest curvature, to the overall shaping surface of the mold 11. In longitudinal cross section then, the mold 11 when closed (Fig. 1) is in the shape of a broad U. In plan, the mold when closed defines the peripheral limits of the glass sheet when bent. Of course, it is to be understood in this respect that while inner rails 25 of end sections 19 are shown herein as being substantially U shaped in plan the individual shapes thereof may be altered to conform to the desired shapes of the glass sheet to be bent.

Now it can be seen that by means of hinge joints 28, the end sections of the mold can be spread into the open position, so as to receive and support a flat sheet of glass G (Fig. 3), in a manner to be hereinafter described, and may then be folded towards each other into the closed position so as to define the shaping surface of the mold for the sheet when bent. Due to the freely-swinging support of the end sections 19 of the mold from rigid frame 12 at a point between the ends of said sections, in spreading to the open position the outer ends thereof will swing outwardly and downwardly on cross rods 17 as center section 21 is raised by hinge joints 28 (see broken lines of Fig. 4). As the outer ends are folded inwardly and upwardly into the closed position, the center section drops back down to its position shown in solid lines in Fig. 4.

The manner of carrying the mold so as to control the influence of the weight of the mold upon the glass and, throughout the bending operation, to gradually increase such influence as the sheet softens and settles onto the shaping surface of the mold can now be understood. That is, the weight of each end section of the mold can be substantially counterbalanced about its link support on cross rod 17 when freely carried thereby such that the weight of the center section and its natural tendency to drop into the closed position will be substantially counterbalanced. Thus, any normal tendency of the glass sheet to shatter under the compressive force of the end sections of the mold will be reduced by the counterbalancing effect due to the novel interrelation of the mold sections in combination with the inherent strength of the strut-like, flat glass sheet. That is, these two forces will be sufficient to initially sustain the mold in an open position, without the glass sheet being shattered until said sheet becomes softened, such that the tendency to shatter is lessened and the sheet descends onto the mold. Thus, as the sheet descends and the end sections of the mold swing as aforementioned, the counterbalancing effect is gradually overcome and the influence of the weight of the center section of the mold gradually increases. Near the completion of the conformance of the glass sheet onto the shaping surface of the mold, the influence of the weight of the center section is greatest and at this time the most severe part of the bending operation occurs as the end areas of the sheet are actually folded onto the shaping surface.

As previously noted, mold 11 is carried on frame 12 by means of cross rods 17 journaled in the freely-swinging ends of links 13. In order to bring about the counterbalance above-mentioned, cross rods 17 are secured to the lower faces of the rails of the end sections 19 between the ends thereof so as to provide, in balanced relation, swinging supports therefor. Thus, the positioning of cross rods 17 along the lower faces of the end sections will determine the amount of counterbalance to be obtained by the end sections and accordingly the amount of force that they will exert endwise of the glass sheet as it is supported in the open position.

In actual practice, a counterbalance is effected, in which the component forces tending to close the mold will be equal to or slightly less than the compressive strength of the glass sheet, when the outer ends of the end sections of the mold are spaced apart sufficiently to accommodate the length of the flat glass sheet. It is noted in this respect that there is a compensating pivotal movement of the freely-swinging ends of the links 13 outwardly from vertical posts 15 when said outer ends are spaced apart when the mold is in the open position, as shown by the broken lines of Figs. 3 and 4. Due to this out-of-plumb relationship of the links, there is an ensuing component of compressive force in addition to the compressive force due to the weight of the center section. These factors then, along with the strength of the glass sheet to be bent as above noted, are taken into consideration in determining the location of cross rods 17 along the underface of the end sections 19 in order that the glass sheet will be held firmly by the counterbalancing effect without being shattered. Obviously, as the location of the cross rods approaches the outer ends of the end sections the counterbalancing effect will diminish.

Figure 5:
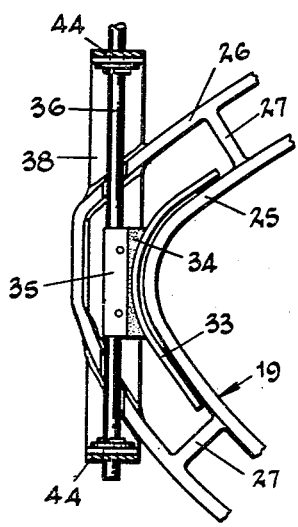
Fig. 5 is a fragmentary sectional view taken substantially on line 5—5 of Fig. 4.

Each of the end sections 19 has means for initially supporting and locating in a horizontal position a flat glass sheet above the open mold and for guiding the sheet in timed relation to the movement of the mold as it descends onto the shaping surface of the mold. As a support member at each end of the sheet there is an arcuately shaped support bar 33, said arcuate shape being of a curvature that substantially conforms to that of adjacent portions of the inner rails 25 of the end sections, and said bar being spaced slightly outwardly from said inner rails when the mold is in the closed position (Figs. 4 and 5). More particularly, the curvature of the bar is determined by the pattern outline of the ends of the glass sheet before being bent so that while the bar is movable into and out of substantial nesting relation with the end sections of the mold as said mold is closed and opened, it will adequately support related end areas of said sheet. For locating the ends of the sheets on the support bars and retaining them firmly thereon, locater bars 34 are disposed in brackets 35 and mounted so as to conform to and extend upwardly from the outer edge of said arcuately shaped support bars 33. These locater bars may be made of marinite or like material which will neither mar nor fuse to the glass and are in flush engagement with said bars for a substantial length thereof, as best shown in Fig. 5.

U-shaped bracket 38 is secured to the underface of the outer rail 26 transversely of mold 11 at the outer end of each of end sections 19. Openings in the legs of the bracket provide journals for the horizontal leg 36 of an L-shaped shaft which extends through recesses in the upper edges of said outer rail in substantially parallel relation with said bracket. Support bar 33 and locater bar 34 are rigidly secured to and supported by the horizontal leg 36 by any suitable means, such as a wedge-shaped weld 37 (Fig. 4), so as to be pivotally movable therewith.

The vertically disposed leg 39 of the L-shaped shaft is turned on itself to form a slotted portion 40 through which is extended a horizontally disposed rod 41 secured to a horizontal supporting bar 42 carried by the adjacent post 15. Thus, as best shown in Fig. 4, the L-shaped shaft swings pivotally in the journal openings in bracket 38 secured to end section 19 and slotted portion 40 of the shaft turns on and is guided by rod 41 in a predetermined path as mold 11 moves from the open position as shown in broken lines to the closed position as shown in solid lines (Fig. 4). In this manner, by means of support bar 33 and locater bar 34, an edge of the glass sheet is also guided in timed relation to the movement of the mold in a predetermined path as leg 36 of the shaft turns in its journals in bracket 38.

When the mold then is in the open position, each end edge of the glass sheet G is held rigidly between and located by locater bar 34 while a peripheral portion of the underside of each end is supported by bar 33, as best shown in Fig. 3. When the mold is in the closed position, support bar 33 is disposed slightly below the shaping surface of the mold (Fig. 4) and in nesting relation therewith, such that the sheet is permitted to freely settle thereon just after the bar swings below said shaping surface. Thus, rod 41 and slotted portion 40 of shaft leg 39 are so disposed with respect to each other that support bar 33 and locater bar 34 will assume the positions above noted as the mold moves from the open to the closed position. Both positions as well as the change in relationship of slot 40 to rod 41 are shown in Fig. 4.

Intermediate of the movement of the mold from open to closed position and during the bending of the sheet, locater bars 34 serve to guide the sheet onto the shaping surface of the mold in timed relation to said movement. That is, as the sheet softens and loses its strut-like character and the weight of the center section 18 of the mold gradually overcomes the counterbalancing effect, locater bar 34 will follow the end edges of the sheet as the ends of the sheet swing inwardly toward the mold. However, inasmuch as the movement thereof is dependent upon slot 40 riding on stationary rod 41, the locater and support bars will move in their predetermined path from their initial horizontal position into their nesting position with the shaping surface of the mold.

As the glass softens it tends to settle initially at its center such that it bends in a broad V shape, after which its ends are folded inwardly in a manner previously described. It is important then that support bar 33 "lead" the end portions of the sheet as both are descending toward the mold in order that no kinks or reverse bends are formed at said end portions directly above the ends of said support bars. It has been found that when the support bars are positively guided as described herein, so as to move in properly timed relation to the movement of the mold, they will support the sheet in a horizontal position prior to its softening but will be angularly disposed with relation thereto as said sheet softens and the end portions thereof begin to swing inwardly. Thus, from its initial to its final nesting position, support bar 33 "leads" the glass sheet. In this manner then, the sheet is deposited onto the end section of the mold shortly after said bar descends past the shaping surface, as aforenoted.

Provision is also made for protecting the extreme end areas of the glass sheet from the adverse effect of the ambient heat to which it is subjected. Due to the thinness of the sheet and as the end areas thereof are smaller in cross-secton than the central area, said end areas will obviously absorb proportionately more of the heat which is necessary to soften the central area and as a consequence will tend to "curl" away from the shaping surfaces of the end sections 19 as the mold moves to the closed position. In order to avoid this curling tendency, a shield 43 is rigidly secured to the back of a broad U-shaped bracket 44, the legs of which are pivotally mounted on the horizontal leg 36 of the L-shaped shaft and outwardly of and in close proximity to bracket 38. An inwardly turned ear 45 (Fig. 1) on each of the legs of the bracket 44 is disposed along that upper edge of each of said legs so as to abut against the upper edges of bracket 38 as shield 43 is swung from one position to another. That is, said ear provides a stop for the swinging movement of said shield as it abuts in alternate positions along bracket 38 at both sides of the pivotal axis of bracket 44 along the horizontal leg 36 of the L-shaped shaft. Preferably the inwardly disposed edges of the shields 43 are serrated, as at 46, to produce a heat gradient above the glass sheet.

While the glass sheets are being loaded or unloaded onto supporting bar 33, the shields 43 are swung out of the way into the inoperative position, as shown by solid lines in Fig. 3, and ears 45 abut against the upper edges of the legs of bracket 38 rearwardly of shaft leg 36. When the glass sheets have been loaded, said shields are swung into the operative position, as shown by the broken lines of Fig. 3, in which position ears 45 abut against the upper edges of the legs of bracket 38 forwardly of shaft 36 (Fig. 1). In this manner, the shields in the operative position are disposed at a regulated distance above the surface of the glass sheet by means of ears 45 in the last-mentioned abutting relation with bracket 38 and will remain in said position as the mold 11 is moved from the open to the closed position.

Figure 6:
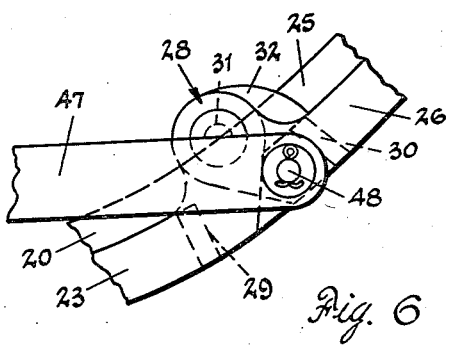
Fig. 6 is an enlarged detail view of the hinged joint shown in Fig. 4 as viewed from the opposite side of said figure.

To assure that both end sections 19 of the mold move from the open to the closed position at the same speed and reach said closed position at substantially the same time, a novel synchronization arrangement is provided. At one side of the mold, linkage rods 47 are pivotally connected at one end to the outside of F-shaped members 30 of end sections 19 by means of studs 48 which extend outwardly from said F-shaped members (Fig. 6) and are journaled in openings in said rods. As best shown in Fig. 2, said linkage rods are spaced from the members 30 by means of spacing washers 49 for free movement with respect to said members and are also bent longitudinally in order that their opposite ends may be pivotally attached by means of pins 50 to the opposite sides and opposite ends of lever plate 51 (Fig. 3). Inasmuch as said lever plate is pivotally mounted at 52 to the outside of outer rail 23 of center section 18 and equidistant from pins 50, it can be seen that the movement of one end section 19 with respect to the center section 18 will result in an equal movement by the opposite end section.

At the other side of the mold there is a stabilizing mechanism by means of which transverse and longitudinal shifting of the mold during movement of the mold from the open to the closed position is prevented and balancing of the influence of the synchronization arrangement above-noted is affected. It has been found that under certain conditions the mold will assume, during bending of the glass sheet G, a tilted or off the horizontal position in which case said sheet may not first settle onto the center of the mold as is desired. This stabilizing mechanism comprises a longitudinal bar 53 which is pivotally mounted at one end to outer rail 23 outwardly of center section 18 by means of a stud 54 projecting from said outer rail and journaled in an opening in said bar. Another opening in the opposite end of bar 53 pivots on a rod 55 projecting inwardly from one of the posts 15. Thus, the bar 53 will swing on rod 55 as center section 19 moves vertically. However, said bar is relatively long with respect to the longitudinal distance between posts 15, so that the degree of curvature of the arc traversed by the end of the bar attached to center section 19 will be small and the longitudinal thrust exerted by said bar on said center section will be negligible. In this manner, the pivot point of the bar 53 at stud 54 will move in a substantially vertical direction and the mold sections will be caused to move from the open to the closed position in predetermined paths.

Secured to and extending inwardly from the side lengths of rectangular base member 14 are supporting arms 56, the top surfaces of which are elevated so as to support the rails of center section 18 when the mold is in the closed position. Thus, links 13 are relieved of much of the weight of the center section when at rest.

It is to be understood that the form of the invention

I claim:

1. In apparatus for bending glass sheets, a mold including a plurality of sections hingedly connected together in end-to-end relation and movable into an open and a closed position, sheet locating and supporting elements pivotally connected to the endmost mold sections, and means for causing said elements to move relatively to said endmost sections in timed relation thereto during movement of the mold from the open to the closed position.

2. In apparatus for bending glass sheets, a mold including a plurality of sections movably connected together in end-to-end relation and movable into an open and a closed position, sheet locating and supporting elements pivotally connected to the endmost mold sections, and means for causing said elements to move relatively to said endmost sections in timed relation with said endmost sections during movement of the mold from the open to the closed position.

3. In apparatus for bending glass sheets, a mold including a plurality of sections hingedly connected together in end-to-end relation and movable into an open and a closed position, sheet locating and supporting elements pivotally connected to the endmost mold sections, and means for causing said elements to move relatively to said endmost sections along definite paths during movement of the mold from the open to the closed position.

4. In apparatus for bending a glass sheet, a mold having a plurality of sections movably connected together in end-to-end relation; means for mountig said mold sections for movement into an open position for receiving a flat glass sheet and to a closed position to which said sheet is adapted to conform when bent, and linkage means connecting said endmost sections to one another at spaced apart points for causing said sections to move from the open to the closed position in timed relation to one another.

5. In apparatus for bending a glass sheet, a mold having a plurality of sections including a center section movably connected together in end-to-end relation, a frame for supporting said mold for movement into an open position for receiving a flat glass sheet and to a closed position to which said sheet is adapted to conform when bent, and linkage means connecting the frame to the center section for causing said center section to move along a definite path from the open to the closed position.

6. In apparatus for bending a glass sheet, a mold having a plurality of sections hingedly connected together in end-to-end relation and including a center section and endmost sections, a frame swingably supporting said mold for movement into an open position for receiving a flat glass sheet and to a closed position to which said sheet is adapted to conform when bent, and linkage means connecting the endmost sections to one another and connecting the frame to the center section for causing said sections to move along definite paths from the open to the closed position in timed relation to one another.

7. In apparatus for bending a glass sheet, a mold having a plurality of sections including a pair of end sections movably connected together in end-to-end relation, a frame for supporting said mold for movement into an open position for receiving a flat glass sheet and to a closed position to which said sheet is adapted to conform when bent, means pivotally connected to an end section for locating said sheet when flat above the open mold and supporting said sheet during bending thereof into conformance with the closed mold, and linkage means connecting said locating and supporting means to said frame for causing said locating and supporting means to move in timed relation to the mold sections during movement of said sections from the open to the closed position.

8. In apparatus for bending a glass sheet of the character defined in claim 7, linkage means connecting said end sections to one another for causing said sections to move from the open to the closed position in timed relation to one another.

9. In apparatus for bending a glass sheet apparatus of the character defined in claim 8, said mold including a center section connected to each of said end sections, and linkage means connecting the frame to said center section for causing said sections to move along definite paths from the open to the closed position.

10. In apparatus for bending glass sheets, a mold including a plurality of sections, hinge means connecting said sections together in end to end relation, and synchronizing means connecting at least two of said sections together at spaced apart points for causing said sections to move from an open to a closed position in timed relation to one another.

11. In apparatus for bending glass sheets, a frame, a plurality of mold sections, hinge means connecting said sections together in end to end relation, means for supporting said sections upon said frame for movement from an open to a closed position, and stabilizing means connecting at least one of said mold sections to said frame for causing said sections to move along definite paths from the open to the closed position of the mold.

References Cited in the file of this patent

UNITED STATES PATENTS

| | | |
|---|---|---|
| 1,999,558 | Black | Apr. 30, 1935 |
| 2,518,951 | Smith | Aug. 15, 1950 |
| 2,551,606 | Jendrisak | May 8, 1951 |
| 2,551,607 | Jendrisak | May 8, 1951 |
| 2,554,572 | Jendrisak | May 29, 1951 |
| 2,608,799 | Babcock | Sept. 2, 1952 |